United States Patent [19]

Mikkelsen et al.

[11] Patent Number: 5,516,536

[45] Date of Patent: May 14, 1996

[54] CHEESE COATING COMPOSITION AND METHOD FOR PRODUCING A PROTECTIVE COATING ON CHEESE

[75] Inventors: Birgitte Mikkelsen, Aarhus; Michael B. Bern, Risskov; Svend Eriksen, Viby, all of Denmark

[73] Assignee: Danisco A/S, Copenhagen, Denmark

[21] Appl. No.: 416,073

[22] Filed: Apr. 3, 1995

[30] Foreign Application Priority Data

Apr. 25, 1994 [DK] Denmark ................................ 0475/94

[51] Int. Cl.⁶ ...................................................... A23B 4/10
[52] U.S. Cl. ............................ 426/99; 426/302; 426/304; 426/582
[58] Field of Search ............................ 426/99, 302, 304, 426/582

[56] References Cited

U.S. PATENT DOCUMENTS

| | | |
|---|---|---|
| 2,615,159 | 10/1952 | Jackson . |
| 2,615,160 | 10/1952 | Baur . |
| 2,745,749 | 5/1956 | Fuege et al. . |
| 3,000,748 | 9/1961 | Clark . |
| 3,388,085 | 6/1968 | Levkoff et al. . |
| 3,667,970 | 6/1972 | Scheide .................................. 426/302 |
| 5,142,072 | 8/1992 | Stipp et al. ............................. 554/172 |

FOREIGN PATENT DOCUMENTS

| | | |
|---|---|---|
| 0037086 | 10/1981 | European Pat. Off. . |
| 0141299 | 5/1985 | European Pat. Off. . |
| 0403030 | 12/1990 | European Pat. Off. . |
| 1453977 | 9/1966 | France . |
| 2030429 | 12/1971 | Germany . |
| 2222280 | 11/1973 | Germany . |
| 2234936 | 12/1974 | Germany . |
| 2411058 | 9/1975 | Germany . |

OTHER PUBLICATIONS

"Modification of Vegetable Oils. XII. Plasticity of Some Aceto Derivatives of Monostearin", R. O. Fuege et al., The Journal of the American Oil Chemists' Society, Jan. 1952, vol. 29, pp. 11–14.

The acceptability of Cooked Poultry Protected by an Edible Acetylated Monoglyceride Coating During Fresh and Frozen Storage, Mary E. Zabik and Lawrence E. Dawson, Food Technology, Jan., 1963, pp. 87–91.

"Acetylated Monoglycerides as Coatings for Selected Foods", Gerald T. Luce, Food Technology, vol. 21, Nov, 1967, pp. 48 to 54.

*Primary Examiner*—Helen Pratt
*Attorney, Agent, or Firm*—Burns, Doane, Swecker & Mathis

[57] ABSTRACT

An improved cheese coating composition comprising specifically defined acetic acid esters of monoglycerides of long-chain fatty acids predominantly comprising stearic acid and behenic acid and a method for producing protective coatings on cheese, as well as a body of cheese bearing on its surface a coating of the improved coating composition.

14 Claims, No Drawings

CHEESE COATING COMPOSITION AND METHOD FOR PRODUCING A PROTECTIVE COATING ON CHEESE

FIELD OF THE INVENTION

The present invention relates to coating compositions suitable as protective coatings for cheese. More specifically, the invention relates to a coating composition comprising acetic acid esters of monoglycerides of long-chain fatty acids predominantly comprising stearic acid and behenic acid. The invention also relates to the method of producing protective coatings on cheese as well as cheese coated with a protective layer of the coating composition.

BACKGROUND OF THE INVENTION

It is well-known that acetylated monoglycerides from the molten state by ordinary cooling to about room temperature solidify into waxy, rather than greasy, polymorphic forms, having great flexibility and stretchability and which further exhibit reduced permeability to water vapor (Feuge et al., *Journal American Oil Chemists Society*, 1952, 29, 11–14).

Due to these unique properties, some acetylated monoglycerides, especially those of saturated fatty acids, have been used or suggested for use as protective coatings for food products.

U.S. Pat. No. 2,615,159 (issued Oct. 21, 1952) describes the waxy translucent alpha- and sub-alpha forms of unsymmetrical triglycerides in which one of the acid residues are radicals of fatty acids having 12 to 22 carbon atoms and the two adjacent acid residues are radicals of fatty acids having 2 to 4 carbon atoms, namely, acetic acid, propionic acid, or butyric acid.

Further, the solid triglycerides, having melting points from 30° C. to 37° C. and predominantly comprising 1-palmityl-2,3-diacetin or 1-stearyl-2,3-diacetin, are suggested as food ingredients.

U.S. Pat. No. 2,615,160 (issued Oct. 21, 1952) discloses mixtures of symmetrical and unsymmetrical diacetyl triglycerides, being in a waxy translucent form of great stability, in which the non-acetyl residues are radicals of fatty acids having 12 to 22 carbon atoms. The mixtures are substantially free from monoglycerides, diglycerides, glycerol, fatty acids, triacetin, and triglycerides containing no acetyl groups. A process for preparing the diacetyl triglycerides is also described, e.g., exemplified by the hydrogenated diacetyl triglyceride derived from rapeseed oil. The waxy translucent form, melting from 31° C. to 38° C., was obtained on cooling the melted material. Without disclosing any specific teachings U.S. Pat. No. 2,615,160 suggests that those diacetyl trigtycerides with melting points above room temperature, but below body temperature, are suitable as coatings for edible products such as fruits, cheese, preserves, and frozen meats.

U.S. Pat. No. 2,745,749 (issued May 15, 1956) concerns acyiated monoglycerides, e.g., acetylated monoglycerides obtained by acetylation of mixtures essentially consisting of glycerol monostearate, glycerol monopalmitate or mixtures hereof. This reference also states that these acetylated monoglycerides have many potential food applications such as coatings for meat products, candies, ice cream bars and cheese.

M. E. Zabik and L. E. Dawson, Food Technology, 1963, 17, 87 to 91, describe the effect of acetylated monoglyceride coatings on cooked poultry during fresh and frozen storage.

G. F. Luce, Food Technology, 1967, 21, 48 to 54, reviews various methods for the application of acetylated monoglycerides in coating food products, such as meat cuts, poultry, sausages, sea foods, small fruits, and nuts. The coating of cheese is not mentioned.

However, despite these early disclosures and proposals, acetoglycerides per se have failed to become of any practical importance as a coating material for cheese.

Presumably, this is due to the fact that only commercially available acetoglycerides have attracted attention, i.e., acetoglycerides derived from saturated, partly saturated or unsaturated triglycerides containing predominantly $C_{16}$ to $C_{18}$ or lower fatty acids and melting at temperatures of up to about 45° C. Such acetoglycerides take too long to solidify and are rather soft and greasy, properties that make them unsuitable as coating materials for cheese and other food products, especially as a coating to be peeled off by the consumer before consumption of the food product.

The prior art has suggested ways to overcome these deficiences. All suggestions so far relate to the use of acetoglycerides in conjunction with other coating materials, such as waxes, mineral paraffins and/or synthetic polymers.

Thus, U.S. Pat. No. 3,000,748 (issued Sep. 19, 1961) describes a coating composition for foodstuffs comprising a mixture of an acetoglyceride in which one of the acid residues is a radical of a long-chain unsaturated fatty acid of from 10 to 30 carbon atoms and a cellulose ester derivative, and U.S. Pat. No. 3,388,085 (issued Jun. 11, 1968) describes a coating composition consisting of ethylene-vinylacetate copolymer dissolved in a liquid fully acetylated monoglyceride.

Several patents disclose similar compositions for coating food products in particular meat products. These include FR-A-1,453,977, DE-A-2,030,429 (published Dec. 30, 1971), DE-A-2,222,280 (published Nov. 15, 1973), DE-A-2,324,936 (published Dec. 5, 1974), DE-A-2,411,058 (published Sep. 11, 1975), and EP-A-037,086 (published Oct. 7, 1981).

EP-A-141,299 (published May 15, 1985) discloses a process for the coating of cheese wherein the cheese to be coated in a first step is covered with a layer of an acetic acid ester of monoglycerides of hydrogenated fatty acids whereupon the so coated piece of cheese in a second step is coated with a layer of wax consisting of a mixture of lowmelting microcrystalline waxes and plastic paraffins. Preferred acetoglycerides are those having a degree of acetylation in the range of 0.5 to 0.7 and which contain groups of saturated fatty acids, in particular stearic and palmitic acids. Such products are commercially available and are characterized by having melting points (dropping points) in the range of 35° to 40° C. A drawback of this method is the tendency of the first applied and low-melting acetoglyceride layer to melt off during the second coating step, resulting in an uneven coating having "icicles" and admixture of paraffins and acetoglyceride making this method impractical to apply from a technical point of view. Furthermore, data has indicated definite or probable toxicity of mineral hydrocarbons. Thus, there seems to be a health risk by using mineral hydrocarbons in cheese coating compositions either by intake through direct consumption or resulting from eating cheese into which these mineral hydrocarbons have migrated.

EP-A-403,030 (published Dec. 19, 1990) relates to a method for coating cheese wherein there is used a coating composition comprising a mixture of a triglyceride wherein one or two of the acid residues are radicals of aliphatic carboxylic acids having 1 to 6 carbon atoms and the other acid residues are radicals of saturated fatty acids having 14 to 22 carbon atoms, and a wax or wax-like component which is not of mineral origin and having a melting point (dropping point) higher than that of the triglyceride in the range of 60° to 110° C. Coating preparations containing acetylated mono/diglycerides with a degree of acetylation of 0.5 to 0.7 and melting points (dropping points) from 35° to 40° C. are specifically disclosed.

However, due to partial miscibility and/or polymorphic behavior of the components, such binary mixtures often have complicated melting and solidification characteristics resulting in melting/solidification which takes place over a broad temperature range. This means that the coating needs a long time to cool to obtain sufficient strength. Dropping points do not disclose such behavior. By means of differential scanning calorimetry (DSC) it is possible to elucidate melting/solidification of such mixtures. For example, it appears that a liquid mixture comprising 70 percent of acetylated monoglycerides with a degree of acetylation of 0.7 and 30 percent stearic acid on solidifying exhibits two distinct crystallization (exothermic) peaks at 43° C. and 33° C. A similar behavior, with crystallization peaks at 55° C. and 32° C., is observed during solidification of a mixture comprising 60 percent of acetylated monoglycerides with a degree of acetylation of 0.6 and 40 percent glyceryl monostearate, and a mixture comprising 55 percent acetylated monoglyceride with a degree of acetylation of 0.6, 40 percent hardened vegetable fat, and 5 percent carnauba wax resulting in three crystallization peaks at 60° C., 36° C. and 30° C. Thus, the disclosed coating compositions in the above-mentioned European Patent Application are not all suitable as cheese coatings.

In summary, it can be stated that the solutions presented in the prior art discussed above as regards the efforts of obtaining a coating composition for cheese are not effective.

In view of the above-mentioned state of the art it would be most desirable to provide a cheese coating composition being relatively high-melting and having transitory and distinct solidification and which is not based on the presence of mineral paraffins, waxes, or synthetic polymers.

An object of the present invention is to provide such a coating composition which further has such mechanical properties that the coating composition when applied to the cheese gives effective protection against external contamination, loss of moisture and physical damage, and which is easy to remove by the consumer.

A further object of the present invention is to provide a method of producing protective coatings on cheese using the coating composition of the present invention and a body of cheese coated with the composition.

SUMMARY OF THE INVENTION

It has been found that a coating composition suitable when molten for the application of an improved protective coating to cheese consists essentially of acetic acid esters of a monoglyceride of mixed substantially fully saturated long-chain fatty acids having a chain length in excess of 10 carbon atoms of which stearic acid and behenic acid in combination constitute more than 80 percent by weight of such long-chain fatty acids and stearic acid constitutes approximately 12.9 to 53 percent by weight of the long-chain fatty acids and behenic acid constitutes approximately 38 to 82.5 percent by weight of the long-chain fatty acids, wherein the proportion of acetic acid esters within the composition is at least 90 percent by weight of the total composition, wherein approximately 40 to 57 percent of the total composition constitutes diacetic acid esters and approximately 40 to 50 percent by weight of the total composition constitutes monoacetic acid esters, wherein the average number of carbon atoms of the long-chain fatty acids is approximately 19.2 to 21.5, and wherein the composition has a melting point of at least 48° C. determined by differential scanning calorimetry.

It has been found that a method for imparting an improved protective coating to a body of a cheese (e.g., a block of cheese) comprises:

(a) applying to the cheese a layer of the improved coating composition of the present invention while molten at a temperature of 55° to 100° C., and (b) allowing the layer to solidify by cooling.

A coated body of cheese also is provided that bears about its surface an improved protective coating as defined herein.

ADVANTAGES OF THE INVENTION

The coating composition according to the invention has a number of significant advantages over prior coating compositions.

Without the need of supplementary substances, the coating composition has an adequately high melting point, ensuring a very short solidification time, without having to expose the cheese to be coated to excessive temperatures. Furthermore, the coating composition according to the invention, in the molten state exhibits favorable viscosities in a broad range from a few degrees above the melting point of the composition and upwards, making it possible to apply an effective coating to the cheese.

The use of the coating composition according to the invention provides a flexible, tough and easy-to-peel coating on the cheese surface.

DESCRIPTION OF PREFERRED EMBODIMENTS

As mentioned above, the present invention relates in one aspect to a solid coating composition comprising mono- and diacetylated monoglycerides based on monoglycerides of mixed, essentially fully hydrogenated (i.e., substantially fully saturated) long-chain fatty acids comprising stearic acid and behenic acid constituting at least 80 percent by weight of the total fatty acid content.

In addition to the above-mentioned major fatty acids, the total fatty acid content may include minor fatty acids such as lauric acid, myristic acid, palmitic acid, arachidic acid and lignoceric acid of which palmitic acid, arachidic acid and lignoceric acid constitute at the most 18 percent of the total fatty acids. Furthermore, negligible amounts of long-chain fatty acids having an uneven number of carbon atoms may be present.

Also negligible amounts of unsaturated fatty acids may be present. The Iodine Value is a measure of the degree of unsaturation of fatty acids. The coating composition according to the invention preferably has an Iodine Value of at the most 2, more preferably at the most 1.

In accordance with the invention, the average number of carbon atoms in the long-chain fatty acid moieties present in the coating composition is in the range of 19.2 to 21.5.

In the present context, the term "the average number of carbon atoms in the long-chain fatty acid moieties" is defined as the average resulting from dividing the total number of carbon atoms in the long-chain fatty acid moieties present as esterified and free moieties with the total number of these moieties.

By "long-chain fatty acids" is understood saturated fatty acids, unsaturated fatty acids or mixtures thereof, having more than 10 carbon atoms.

As previously mentioned, the proportion of acetic acid esters, present as diacetic and monoacetic acid esters, in the coating composition according to the invention is at least 90 percent, preferably at least 95 percent, by weight of the composition.

Such compositions are obtainable by using acetoglycerides which have been acetylated to a degree of at least 0.7 (70 percent). A degree of acetylation of at least 0.7 ensures that the content of non-acetylated monoglyceride in the coating composition is very low, preferably below 5 percent by weight of the composition, and the content of acetic acid esters of monoglyceride at the same time is at least 90 percent by weight of the composition. In the coating composition according to the invention, the content of unwanted but unavoidable components such as glycerol, free fatty acids and diglycerides is very low. Thus, the total amount of glycerol, free fatty acids, monoglycerides and diglycerides is at the most 10 percent, preferably at the most 5 percent, by weight of the coating composition.

According to the invention, 40 to 57 percent by weight of the coating composition is diacetic acid esters and 40 to 50 percent by weight of the coating composition is monoacetic acid esters.

The acetoglyceride compositions which are suitable as coating material according to the invention can be prepared by conventional methods well-known in the art. Advantageously they can be produced by reacting distilled monoglycerides of fatty acids, having a content of monoester above 90 percent, with acetic anhydride at a temperature in the range of 100° C. to 150° C., simultaneously removing the acetic acid formed. In practice, there will be substantial agreement between the average number of carbon atoms, as defined above, in the long-chain fatty acid moieties present in the monoglyceride and the average number of carbon atoms in the long-chain fatty acid moieties in the coating composition according to the invention.

The melting point is an important property for a cheese coating composition which is applied to cheese as a liquid layer or film and solidified by cooling. The term "melting point" is used in the present context as that peak temperature at which melting is observed during a heating run in a differential scanning calorimetry experiment.

In accordance with the above definition the coating composition of the present invention has a melting point of at least 48° C.

Applicants have found that a melting point of at least 48° C. ICs essential to achieve short solidification times even when cooling takes place at room temperature and at the same time to provide a coating on cheese which make it possible for the consumer to handle the coated cheese and to remove the coating without the coating layer softening and becoming greasy.

On the other hand, coating compositions having too high melting points are not suitable, as such compositions, when applied to the cheese, expose the cheese to temperatures which may cause damage to the cheese.

Surprisingly it has been found that the compositions according to the invention are highly suitable for coating a body of cheese, especially small and medium-sized cheeses of solid to semi-solid consistency. The coating compositions of the present invention provide protective coatings which, at room temperature as well as in the cold, are flexible and tough without being brittle and which may easily be removed from the cheese without adhering to the cheese.

Tensile tests or pull tests of the compositions according to the invention are carried out by means of an automated materials testing machine (Model 4301; Instron Corporation, USA), which provide information on the strength and ductility of the materials, showed that the coating compositions according to the present invention have mechanical properties which are comparable with those of conventional cheese waxes.

Thus, it was found that the coating compositions according to the invention exhibit the following mechanical characteristics:

Strain at peak, Percent: 9 to 22,

Young's modulus, mPa: 13.1 to 44.1, and

Stress at peak (tensile strength), mPa: 0.17 to 1.02.

For purposes of comparison Table 1 shows the mechanical properties of a conventional cheese wax (WITCO) comprising mineral paraffins, and commercial acetoglycerides (CETODAN) made from fully hydrogenated edible lard or tallow having degrees of acetylation in the range of 0.5 to 0.7 and melting points from about 30° C. to about 45° C. Table 1 further shows the mechanical properties of two acetoglyceride compositions with the chemical analysis shown in Table 2. These compositions are not intended to be covered by the present invention.

When evaluating the suitability of the coating compositions according to the invention as coating materials, especially as regards the peeling properties of the coating material, it was found that the elasticity, expressed by Young's modulus, was more conclusive than the plasticity, expressed by "Percent Strain at peak" and "Stress at peak". Thus, it was found that by increasing values of Young's modulus the compositions became more brittle.

Coating compositions having a Young's modulus of about 50 mPa or more were generally too brittle and when applied to cheese it was not possible to peel off the coating of such compositions as an unbroken piece. Compositions having small values of Young's modulus were found to be too soft and stretchable on peeling cheese coated with these compositions.

TABLE 1

| | Strain at peak | Young's modulus | Stress at peak |
|---|---|---|---|
| | Percent | mPa | mPa |
| COMP. A | 17.5 | 55.1 | 1.11 |
| COMP. B | 17.2 | 51.6 | 0.79 |
| CHEESE WAX | 20.6 | 38.0 | 1.14 |
| CETODAN | 12.4 to 23.4 | 3.9 to 6.6 | 0.07 to 0.16 |

Compositions A and B were too brittle as indicated in Table 1. Furthermore, it was observed that cracks developed in the coating when handling cheese coated with these compositions.

TABLE 2

| | COMP. A | COMP. B |
|---|---|---|
| Melting point, °C. | 59.3 | 58.7 |
| Monoacetylated, Percent | 47.9 | 41.3 |
| Diacetylated, Percent | 49.8 | 56.4 |

TABLE 2-continued

|  | COMP. A | COMP. B |
| --- | --- | --- |
| $C_{18}$ fatty acid, Percent | 1.3 | 1.3 |
| $C_{22}$ fatty acid, Percent | 95.1 | 95.2 |
| Average carbon number | 21.8 | 21.8 |

When examining the coating compositions according to the invention by differential scanning calorimetry (DSC) the compositions showed the same general behavior. When heating the coating compositions according to the invention a single sharp endothermic peak representing the melting process, corresponding to about 100 J/g, was observed at a temperature above 48° C. Furthermore, one, sometimes two, endothermic peaks representing solid-solid transitions, corresponding to 2 to 19 J/g, located at 10° to 28° C. were observed. By cooling from the melted state similar, but now exothermic, peaks were observed.

Without being bound by theory we assume, by analogy with prior art acetoglycerides, that the peak in the temperature range of 10° to 28° C. represents the reversible transition between alpha and sub-alpha forms of the acetoglycerides constituting the coating composition of the present invention.

Applicants have seen some correlation between the temperature at which this reversible transition takes place and Young's modulus. Typically, the lower the transition temperature the smaller Young's modulus and the better the compositions of the present invention perform as coating compositions by being less brittle and more peelable. A sensory analysis panel of four persons evaluated coatings of compositions having a transition temperature below 22° C. to perform better than those compositions having a transition temperature above 22° C.

Thus, preferred coating compositions according to the invention are compositions having a single endothermic DSC peak above 22° C. and in which stearic acid makes up 24 to 53 percent by weight and behenic acid makes up 38 to 67 percent by weight of the total long-chain fatty acids present in the composition.

The monoglycerides to be used in the above-mentioned acetylation process are obtainable by a wide variety of methods also well-known in the art, such as esterification or transesterification of glycerol with mixed fatty acids or fatty acid lower alkyl esters using basic or acidic esterification catalysts, or glycerolysis of completely hydrogenated naturally occurring triglycerides (fats and oils). In practice, the average number of carbon atoms in the long-chain fatty acid moieties will substantially remain unchanged during these reactions.

Mixed fatty acids per se or completely hydrogenated triglycerides, having a fatty acids content and an average number of carbon atoms in the long-chain fatty acid moieties as defined according to the present invention can serve as sources of the fatty acids moieties present in the coating composition according to the invention.

Thus, in a preferred embodiment of this invention the acetoglycerides constituting the coating composition according to the invention are derived from monoglycerides made from essentially fully hydrogenated naturally high erucic oils originating from species and cultivars of the genus Brassica, e.g., *B. campestris* or *B. napus,* having the following principal fatty acid composition by weight percent of the total fatty acids:

(a) at most 8 percent of palmitic acid,
(b) at least 30 percent of stearic acid,
(c) at most 10 percent of arachidic acid,
(d) at least 40 percent of behenic acid, and
(e) at most 4 percent of lignoceric acid.

Among the vegetable oils high erucic oil (rapeseed oil) is characterized in that the oil contains a substantial concentration of erucic acid together with eicosenoic acid and unsaturated and saturated $C_{18}$ fatty acids. High erucic acid rapeseed oil and fully hydrogenated high erucic acid rapeseed oil are commercially available triglycerides. Thus, principal fatty acids in fully hydrogenated high erucic oil are stearic acid, arachidic acid, and behenic acid. The fatty acid composition, however, varies considerably depending on the origin of the high erucic oil, e.g., species, variety, location. The ranges of fatty acid distribution in normally available hardened (i.e., hydrogenated) high erucic oil are: 0.5 to 8 percent palmitic acid, 30 to 70 percent stearic acid, 1 to 15 percent arachidic acid, and 30 to 60 percent behenic acid.

To enhance the appearance of the coated cheese coloring additives, such as at least one dye and/or pigment can be added to the coating composition according to the invention.

In a second aspect, the present invention relates to a method of producing protective coatings on cheese using the coating composition according to the invention.

The coating composition according to the invention can be applied to the cheese by immersing the cheese into a bath of the liquid coating composition at a temperature in the range of 55° to 100° C., preferably in the range of 60° to 80° C., for a sufficient length of time to provide a complete covering of the cheese to be coated.

The liquid layer is permitted to solidify and harden by cooling it at room temperature or at lower temperatures to provide a solid, continuous layer around the cheese.

By the method according to the invention the thickness of the coating can be varied widely.

The thickness of the coating layer is chiefly controlled by the viscosity of the liquid coating composition. Like most other liquids, the viscosity of the liquid coating composition according to the invention will decrease with increasing temperatures. Thus, when immersing the cheese at a low temperature the coating becomes thicker than when immersing it at a higher temperature.

Also the immersion time and the temperature of the cheese to be coated have some influence on the thickness of the coating. Preferably, the immersion time is from about 2 to about 3 seconds. It is also preferred that the temperature of the cheese is from about 5° C. to about 10° C.

Highly satisfactory results are obtained when one or more further layers of the composition according to the invention are placed upon the first coating.

This can be accomplished by repeated immersion of the same piece of cheese in the bath of the liquid coating composition, each time followed by cooling and hardening of the applied layer. In that way it is possible to obtain coatings of any thickness.

To reduce the melt-off of a previously applied layer of the coating composition according to the invention, it is advantageous that a subsequent immersion is carried out in a bath of the liquid coating composition that is provided at a temperature which is lower than the temperature of any preceding bath.

The practice of the method by using the coating composition according to the invention, on small to medium-sized cheeses of solid to semi-solid consistency, provides continuous coatings free of "pinholes" and "icicles" and which are easily removed from the cheeses in an unbroken piece without adhering to the cheeses.

Alternatively, the coating composition according to the invention may be applied by spraying or brushing the liquid composition onto the cheese to be coated.

The following examples present representative embodiments of the claimed invention. It should be understood that the invention is not limited to the specific details set forth in the examples.

EXAMPLES

Example Nos. 1 to 14

Examples/compositions 1 to 14 represent preferred embodiments of the invention. Each of the compositions was prepared in known ways by acetylation of distilled monoglycerides of fully hydrogenated long-chain fatty acids, predominantly comprising stearic acid and behenic acid. The distilled monoglycerides were of high purity, typically more than 95 percent by weight.

Example No. 13 represents a coating composition derived from a distilled monoglyceride prepared by glycerolysis of a fully hydrogenated high erucic rapeseed oil having the following fatty acid composition in percent by weight of the total amount of fatty acids: $C_{12}$:0.2, $C_{14}$:0.2, $C_{16}$:8.0, $C_{17}$:0.1, $C_{18}$:39.7, $C_{18:1}$:0.5, $C_{18:2}$:0.1, $C_{20}$:8.7, $C_{21}$:0.1, $C_{22}$:41.3, $C_{23}$0.1, and $C_{24}$:1.0. Average number of carbon atoms ("average carbon number"): 19.7.

Example Nos. 1 to 14 were analysed by standard methods known in the art. The results are shown in Tables 3 and 4.

The melting points were determined by means of differential scanning calorimetry (DSC) as described below.

The fatty acid composition of Examples 1 to 14 was measured by gas chromatography of the fatty acid methyl esters prepared by any standard method, e.g., by transesterification using sodium methoxide. The fatty acid composition in Tables 3 and 4 indicates per cent fatty acid by weight of the total amount of fatty acids. The average carbon number is calculated on the basis of the fatty acid composition in Tables 3 and 4.

The acetylated monoglycerides were measured by gas chromatography of their TMS derivatives.

TABLE 3

| | EXAMPLES | | | | | | |
|---|---|---|---|---|---|---|---|
| | 1 | 2 | 3 | 4 | 5 | 6 | 7 |
| Melting point | 57.0 | 54.7 | 51.9 | 48.3 | 57.1 | 54.5 | 51.7 |
| Monoacetylated monoglycerides | 47.4 | 47.0 | 48.2 | 49.2 | 46.6 | 46.5 | 45.7 |
| Diacetylated monoglycerides | 50.1 | 48.5 | 47.5 | 45.9 | 49.4 | 49.5 | 48.8 |
| Fatty acid distribution: | | | | | | | |
| $C_{12}$ | — | 0.1 | 0.1 | 0.2 | 0.1 | 0.1 | 0.1 |
| $C_{14}$ | 0.1 | 0.1 | 0.1 | 0.2 | 0.1 | 0.1 | 0.1 |
| $C_{16}$ | 1.5 | 2.3 | 3.1 | 3.9 | 1.2 | 2.1 | 2.9 |
| $C_{17}$ | 0.1 | 0.1 | 0.1 | 0.1 | 0.1 | 0.1 | 0.1 |
| $C_{18}$ | 13.8 | 26.0 | 38.2 | 50.5 | 12.9 | 24.9 | 37.5 |
| $C_{19}$ | — | — | — | — | — | — | — |
| $C_{20}$ | 3.7 | 3.4 | 3.1 | 2.8 | 0.8 | 1.0 | 1.1 |
| $C_{21}$ | — | — | — | — | — | — | — |
| $C_{22}$ | 78.1 | 65.0 | 52.8 | 40.5 | 82.5 | 69.9 | 56.7 |
| $C_{22:u}$* | 1.0 | 0.9 | 0.7 | 0.5 | 0.6 | 0.6 | 0.4 |
| $C_{23}$ | — | — | — | — | — | — | — |
| $C_{24}$ | 2.6 | 2.2 | 1.8 | 1.5 | 1.6 | 1.4 | 1.2 |
| Average carbon number | 21.3 | 20.6 | 20.1 | 19.6 | 21.3 | 20.8 | 20.2 |

*$C_{22:u}$ = Unsaturated $C_{22}$ fatty acids.

TABLE 4

| | EXAMPLES | | | | | | |
|---|---|---|---|---|---|---|---|
| | 8 | 9 | 10 | 11 | 12 | 13 | 14 |
| Melting point | 48.6 | 56.9 | 53.8 | 50.0 | 48.5 | 48.5 | 48.1 |
| Monoacetylated monoglycerides | 46.3 | 40.0 | 40.0 | 41.2 | 48.3 | 49.3 | 49.7 |
| Diacetylated monoglycerides | 50.1 | 54.9 | 56.5 | 56.1 | 42.9 | 43.3 | 41.5 |
| Fatty acid distribution: | | | | | | | |
| $C_{12}$ | 0.1 | 0.1 | 0.1 | 0.1 | — | 0.1 | 0.1 |
| $C_{14}$ | 0.1 | 0.1 | 0.1 | 0.1 | 0.1 | 0.2 | 0.2 |
| $C_{16}$ | 3.8 | 1.3 | 2.0 | 3.0 | 3.9 | 7.2 | 5.7 |
| $C_{17}$ | 0.1 | — | 0.1 | 0.1 | — | 0.1 | 0.1 |
| $C_{18}$ | 50.5 | 13.1 | 24.5 | 37.9 | 51.0 | 40.2 | 49.6 |
| $C_{19}$ | — | — | — | — | — | — | — |
| $C_{20}$ | 1.3 | 0.8 | 1.0 | 1.1 | 1.3 | 8.9 | 1.2 |
| $C_{21}$ | — | — | — | — | — | 0.1 | 0.1 |
| $C_{22}$ | 42.9 | 82.5 | 70.4 | 56.1 | 42.6 | 41.7 | 42.0 |
| $C_{22:u}$* | 0.3 | — | 0.6 | 0.4 | 0.8 | — | — |
| $C_{23}$ | — | — | — | — | — | 0.1 | — |
| $C_{24}$ | 1.0 | — | 1.4 | 1.2 | 0.9 | 0.9 | 1.0 |
| Average carbon number | 19.7 | 20.9 | 20.8 | 20.2 | 19.7 | 19.7 | 19.4 |

*$C_{22:u}$ = Unsaturated $C_{22}$ fatty acids.

Tensile testing

The tensile tests of the coating compositions of Example Nos. 1 to 14 were performed by means of an automated materials testing machine (Model 4301; Instron Corporation, USA) according to DIN 53455. The tests were carried out at room temperature. The results (Young's modulus) are shown in Table 5.

Differential scanning calorimetry

The thermal behavior, i.e., melting and crystallization, of the coating compositions of Example Nos. 1 to 14 was studied by means of a Perkin-Elmer DSC-4 differential scanning calorimeter. The samples (3 to 6 mg) were loaded into aluminum sample pans which were sealed. The samples were heated to 80° C. at a rate of 10° C./min and then cooled to 0° C. at a rate of 10° C./min to bring about solidification and reheated to 80° C. at a rate of 10° C./min to ensure that the thermal history of the samples was the same. The transition temperatures taken were the peak temperatures. The melting temperatures and the temperatures for the reversible alpha—sub alpha transition are shown in Table 5.

TABLE 5

| Composition Example | Temperatures (°C.) of | | Young's Modulus (mPa) |
|---|---|---|---|
| | Melting | $\alpha$ – sub $\alpha$ transition | |
| 1 | 57.0 | 23.6 | — | 19.6 |
| 2 | 54.7 | 21.7 | — | 23.8 |
| 3 | 51.9 | 18.9 | — | 20.5 |
| 4 | 48.3 | 15.0 | — | 22.0 |
| 5 | 57.1 | 28.9 | 23.9 | 35.9 |
| 6 | 54.5 | 28.1 | 21.9 | 44.1 |
| 7 | 51.7 | 19.4 | — | 21.1 |
| 8 | 48.6 | 15.7 | — | 13.1 |
| 9 | 56.9 | 29.1 | 24.1 | 37.9 |
| 10 | 53.8 | 27.8 | 21.9 | 34.2 |
| 11 | 50.0 | 18.8 | — | 25.0 |
| 12 | 48.5 | 15.5 | — | 13.8 |
| 13 | 48.5 | 16.2 | — | 23.2 |
| 14 | 48.1 | 15.0 | — | 18.0 |

Viscosity

The viscosity of the coating compositions of Example Nos. 1 to 14 was measured by means of a Bohlin Rheometer VOR in the temperature range of 60° C. to 100° C. The viscosities at 60° C., 80° C. and 100° C. are shown in Table 6.

TABLE 6

| Coating composition | Viscosity (mPas) at | | |
| --- | --- | --- | --- |
| of Example Nos. | 60° C. | 80° C. | 100° C. |
| 1, 2, 5, 6, 9 | 18.0 to 18.9 | 13.4 to 13.7 | 6.9 to 7.0 |
| 3, 4, 7, 8, 10, 11, 12, 13, 14 | 16.7 to 17.7 | 9.5 to 10.1 | 6.5 to 6.8 |

Example No. 15

Pieces of semi-solid cheese, having a fat content of about 25 percent, were coated one and two times respectively with the coating composition of Example No. 12.

The pieces of cheese to be coated, having an average weight of 22 g and a surface area of about 46 cm$^2$, were taken directly from the refrigerator and provided with a paper ribbon around the piece of cheese and were dipped into a bath of the melted coating composition by holding the cheese under the bath surface for a period of about 2 seconds, while maintaining the bath at a temperature of 73° to 75° C. The cheese was removed from the bath and cooled at room temperature to solidify the coating. The coating solidified in about 3 seconds. The results of 4 trials are shown in Table 7.

TABLE 7

| | WEIGHT (g) OF | | |
| --- | --- | --- | --- |
| Trial | CHEESE | CHEESE + COATING | COATING |
| 1 | 22.91 | 24.45 | 1.54 |
| 2 | 21.44 | 22.93 | 1.49 |
| 3 | 22.96 | 24.52 | 1.56 |
| 4 | 22.17 | 23.68 | 1.51 |
| Mean | 22.37 | 23.90 | 1.53 |

Assuming a specific gravity of about 0.95 g/cm$^3$ for the solid coating composition, we found that the coating composition had been applied in a layer with thickness of about 0.35 mm.

When coating two times with the coating composition the cooling period at room temperature between the 1st and the 2nd dip was about 9 seconds. The results of 4 trials are shown in Table 8.

TABLE 8

| | WEIGHT (g) OF | | |
| --- | --- | --- | --- |
| Trial | CHEESE | CHEESE + COATING | COATING |
| 1 | 22.63 | 24.96 | 2.33 |
| 2 | 21.47 | 23.70 | 2.23 |
| 3 | 22.08 | 24.32 | 2.24 |
| 4 | 23.34 | 25.67 | 2.33 |
| Mean | 22.38 | 24.66 | 2.28 |

The thickness of the coating layer was found to be about 0.52 mm.

Example No. 16

As described in Example No. 15 coating of pieces of cheese was performed by dipping once at 63° C. and 92° C., respectively, and twice at 63° C. and 92° C., respectively. The results are shown in Table 9.

TABLE 9

| Coating composition | Weight (g) of coating | | | |
| --- | --- | --- | --- | --- |
| | Dipping at 63° C. | | Dipping at 92° C. | |
| of Examples | 1X | 2X | 1X | 2X |
| 5 | 2.16 | 3.80 | 1.38 | 1.81 |
| 6 | 2.04 | 3.52 | 1.19 | 1.71 |
| 7 | 2.00 | 3.30 | 1.05 | 1.35 |
| 8 | 1.78 | 2.95 | 0.99 | 1.04 |

By calculation is found that the thickness of the applied coatings is:

0.4 to 0.5 mm by dipping once at 63° C., 0.7 to 0.9 mm by dipping twice at 63° C., 0.2 to 0.3 mm by dipping once at 92° C., and 0.2 to 0.4 mm by dipping twice at 92° C.

Although the invention has been described with preferred embodiments, it is to be understood that variations and modifications may be resorted to as will be apparent to those skilled in the art. Such variations are to be considered within the purview and scope of the claims appended hereto.

We claim:

1. A coating composition suitable when molten for the application of an improved protective coating to cheese that is flexible, tough, non-greasy and easy to peel consisting essentially of acetic acid esters of a monoglyceride of mixed substantially fully saturated long-chain fatty acids having a chain length in excess of 10 carbon atoms of which stearic acid and behenic acid in combination constitute more than 80 percent by weight of such long-chain fatty acids and stearic acid constitutes approximately 12.9 to 53 percent by weight of said long-chain fatty acids and behenic acid constitutes approximately 38 to 82.5 percent by weight of said long-chain fatty acids, wherein the proportion of acetic acid esters within the composition is at least 90 percent by weight of the total composition, wherein approximately 40 to 57 percent of the total composition constitutes diacetic acid esters and approximately 40 to 50 percent by weight of the total composition constitutes monoacetic acid esters, wherein the average number of carbon atoms of said long-chain fatty acids is approximately 19.2 to 21.5, and wherein the composition has a melting point of at least 48° C. determined by differential scanning calorimetry.

2. A coating composition suitable when molten for the application of an improved protective coating to cheese according to claim 1 wherein the proportion of acetic acid esters within the composition is at least 95 percent by weight of the total composition.

3. A coating composition suitable when molten for the application of an improved protective coating to cheese according to claim 1 wherein said stearic acid constitutes approximately 24 to 53 percent by weight of said long-chain fatty acids and said behenic acid constitutes approximately 38 to 67 percent by weight of said long-chain fatty acids, and wherein the composition exhibits a single endothermic differential scanning calorimetry peak above 22° C.

4. A coating composition suitable when molten for the application of an improved protective coating to cheese according to claim 1 wherein said acetic acid esters of a monoglyceride of mixed substantially fully saturated long chain fatty acids were derived from substantially fully hydrogenated high erucic acid rapeseed oil.

5. A coating composition suitable when molten for the application of an improved protective coating to cheese according to claim 1 wherein said acetic acid esters of a monoglyceride of mixed substantially fully saturated long-chain fatty acids were derived from substantially fully hydrogenated high erucic acid rapeseed oil and have the following fatty acids as the principal components in the weight concentrations indicated based upon the total weight of said fatty acid components present therein:

(a) at most 8 percent of palmitic acid, (b) at least 30 percent of stearic acid, (c) at most 10 percent of arachidic acid, (d) at least 40 percent of behenic acid, and (e) at most 4 percent of lignoceric acid.

6. A coating composition suitable when molten for the application of an improved protective coating to cheese according to claim 1 that includes at least one dye and/or pigment.

7. A method for imparting an improved protective coating to a body of cheese comprising:

(a) applying to said cheese a layer of the improved coating composition while molten at a temperature of 55° to 100° C. wherein said composition consists essentially of acetic acid esters of a monoglyceride of mixed substantially fully saturated long-chain fatty acids having a chain length in excess of 10 carbon atoms of which stearic acid and behenic acid in combination constitute more than 80 percent by weight of such long-chain fatty acids and stearic acid constitutes approximately 12.9 to 53 percent by weight of said long-chain fatty acids and behenic acid constitutes approximately 38 to 82.5 percent by weight of said long-chain fatty acids, wherein the proportion of acetic acid esters within the composition is at least 90 percent by weight of the total composition, wherein approximately 40 to 57 percent of the total composition constitutes diacetic acid esters and approximately 40 to 50 percent by weight of the total composition constitutes monoacetic acid esters, wherein the average number of carbon atoms of said long-chain fatty acids is approximately 19.2 to 21.5, and wherein the composition has a melting point of at least 48° C. determined by differential scanning calorimetry, and (b) allowing said layer to solidify by cooling to form a protective coating that is tough, non-greasy and easy to peel.

8. A method for imparting an improved protective coating to a body of cheese according to claim 7 wherein said composition is provided at a temperature of 60° to 80° C. in step (a).

9. A method for imparting an improved protective coating to a body of cheese according to claim 7 wherein said step (b) is conducted by cooling to room temperature.

10. A method for imparting an improved protective coating to a body of cheese according to claim 7 wherein said cheese is provided at a temperature of approximately 5° to 10° C. immediately prior to the application of said coating in step (a).

11. A method for imparting an improved protective coating to a body of cheese according to claim 7 wherein said cheese is provided at a temperature of approximately 5° to 10° C. immediately prior to step (a) and is immersed in said molten composition for approximately 2 to 3 seconds prior to being withdrawn while having a layer of said composition adhering to the surface thereof.

12. A method for imparting an improved protective coating to a body of cheese according to claim 7 wherein steps (a) and (b) are repeated at least one time so as to provide a protective coating of increased thickness about the surface of said body of cheese.

13. A body of cheese bearing an improved protective coating about its surface formed by the method of claim 7.

14. A body of cheese bearing an improved protective coating about its surface formed by the method of claim 12.

* * * * *